Aug. 11, 1964   H. F. HERBIG ETAL   3,144,519
SOUND MONITORING AND RECORDING SYSTEM
Filed Aug. 16, 1960   4 Sheets-Sheet 1

INVENTORS.
HENRY F. HERBIG
MARCO PADALINO
BRUCE McADAMS
HARRY G. WHITEHEAD
GORDON M. NONNEMACHER
BY
ATTORNEY

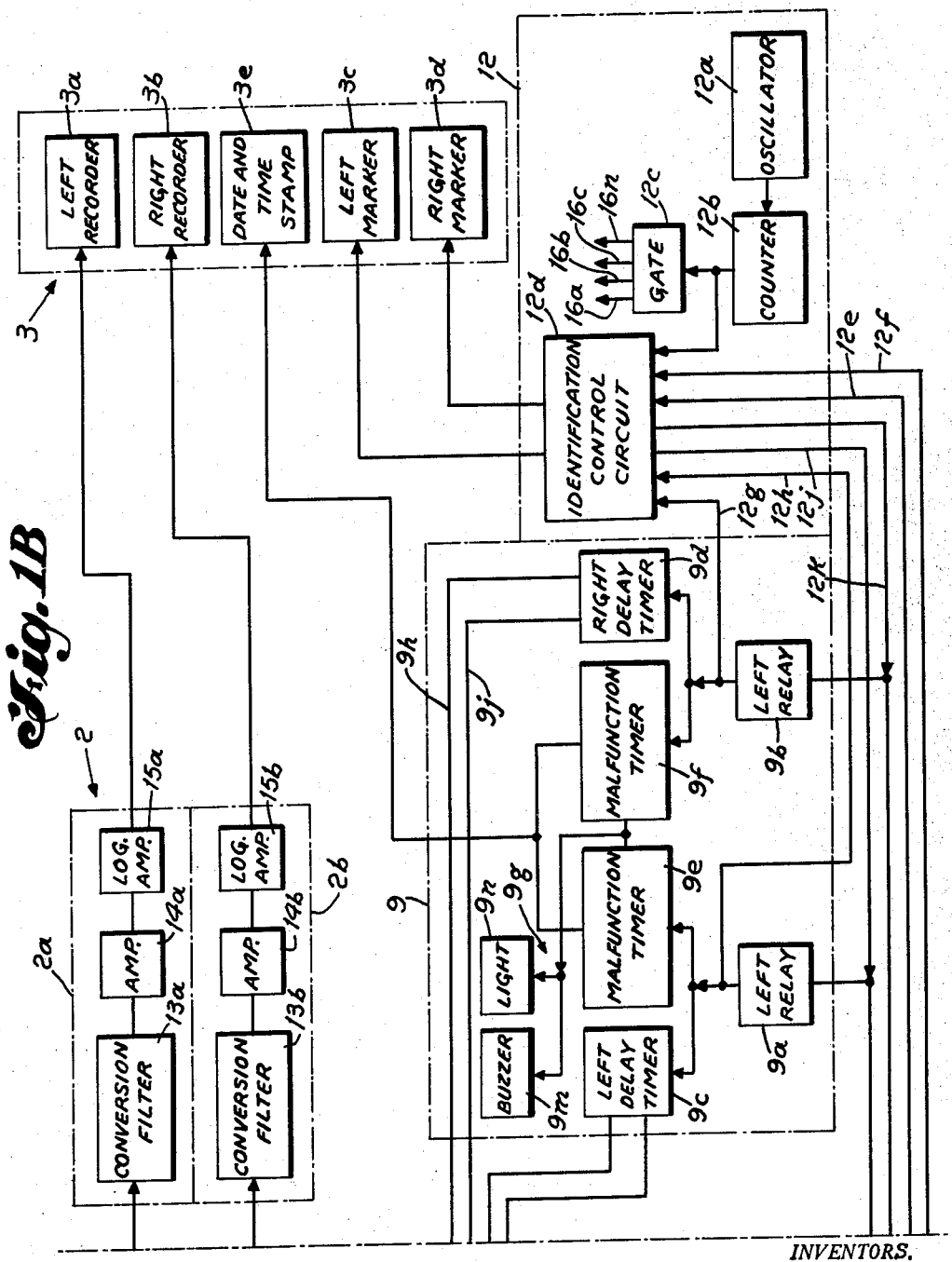

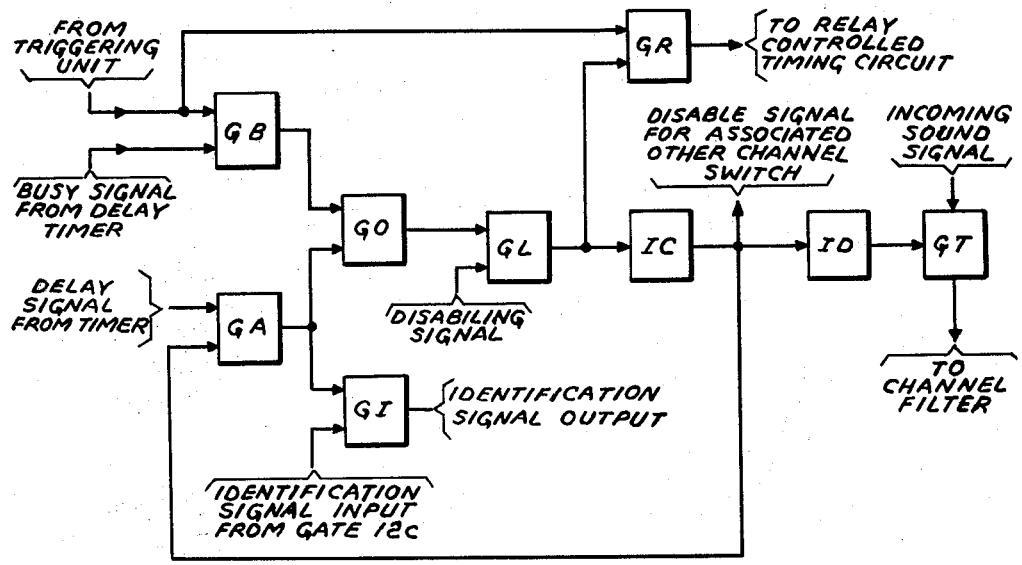
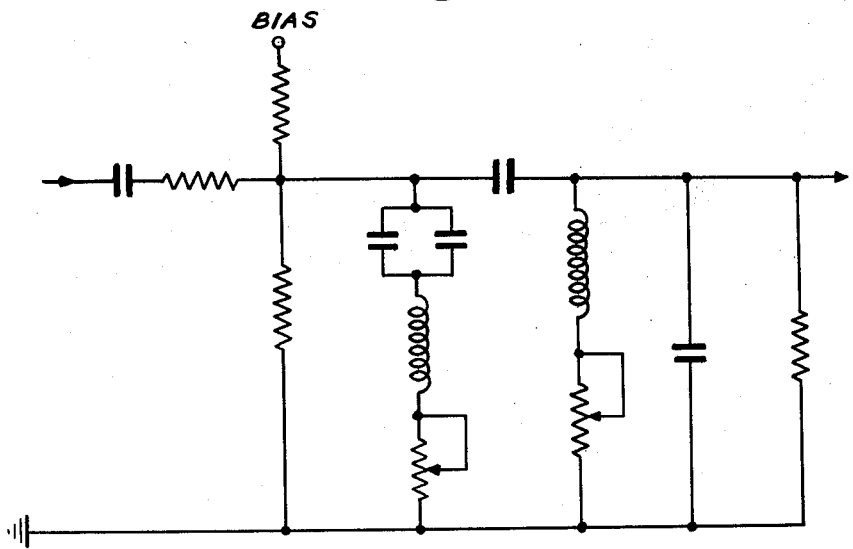

Aug. 11, 1964   H. F. HERBIG ETAL   3,144,519
SOUND MONITORING AND RECORDING SYSTEM
Filed Aug. 16, 1960   4 Sheets-Sheet 4

INVENTORS.
HENRY F. HERBIG
MARCO PADALINO
BRUCE McADAMS
HARRY G. WHITEHEAD
GORDON M. NONNEMACHER
BY
ATTORNEY

United States Patent Office 3,144,519
Patented Aug. 11, 1964

3,144,519
SOUND MONITORING AND RECORDING SYSTEM
Henry F. Herbig, Smoke Rise, and Harry G. Whitehead, Murray Hill, N.J., Marco Padalino, Yonkers, N.Y., and Gordon M. Nonnemacher, Rahway, and Bruce Mc-Adams, Pompton Plains, N.J., assignors to International Telephone and Telegraph Corporation, Nutley, N.J., a corporation of Maryland
Filed Aug. 16, 1960, Ser. No. 50,015
5 Claims. (Cl. 179—100.1)

This invention relates to sound monitoring and recording systems, and particularly to a system for monitoring variations in ambient sound at remote locations and for recording the intensity of the sound whenever the monitored sound exceeds a predetermined level.

In any diverse instances it is desirable to monitor the sound intensity at one or more remote locations and provide a permanent indication of such sound intensity for purposes of record. For example, the advent of the jet aircraft for commercial use has presented a sound problem in airport operation. The increased sound produced by this type aircraft causes disturbance to the neighboring communities with resulting complaints of interference with conversation, rest, and disturbances of peace. It is therefore useful and desirable for the airport operators to have a system which will monitor the aircraft noise at selected locations about the airport where maximum noise is expected, and to record the monitored sound in acceptable units along with an indication on the record of the sound location and the time of occurrence in order to enforce operational regulations which require aircraft sounds to be kept below an objectional level.

An object of the present invention is to provide a system for monitoring sound at remote points, and particularly for centrally recording the intensity of the sound above a given value, the time the sound occurs, and the location of the monitoring point.

Another object of the present invention is to provide a sound monitoring and recording system wherein the monitored sound is recorded in units relative to the degree of human annoyance inherent therein.

A feature of the present invention is the provision of a sound monitoring and recording system for monitoring ambient sound at remote locations and recording the level of said sound at a central location comprising means for providing a reference sound, means for receiving and converting said ambient sound and said reference sound into a single electrical signal, means responsive to said electrical signal to modify said signal in accordance with a given function, and means for recording said modified signal from said responsive means.

Another feature of the present invention is the provision of a sound monitoring and recording system as described wherein said responsive means includes a filter having a frequency response which varies in accordance with the frequency of said electrical signal to provide an output signal which is a given function of the frequency of said electrical signal.

The above-mentioned and other features and objects of this invention will become more apparent by reference to the following description taken in conjunction with the accompanying drawings, in which:

FIGS. 1a and 1b are a schematic block diagram of an embodiment of a sound monitoring and recording system following the principles of the present invention.

FIG. 2 is a logical block diagram of a switching circuit employed in the system of FIG. 1.

FIG. 3 is a schematic diagram of a conversion filter useful in the system shown in FIG. 1.

Figure 1A:
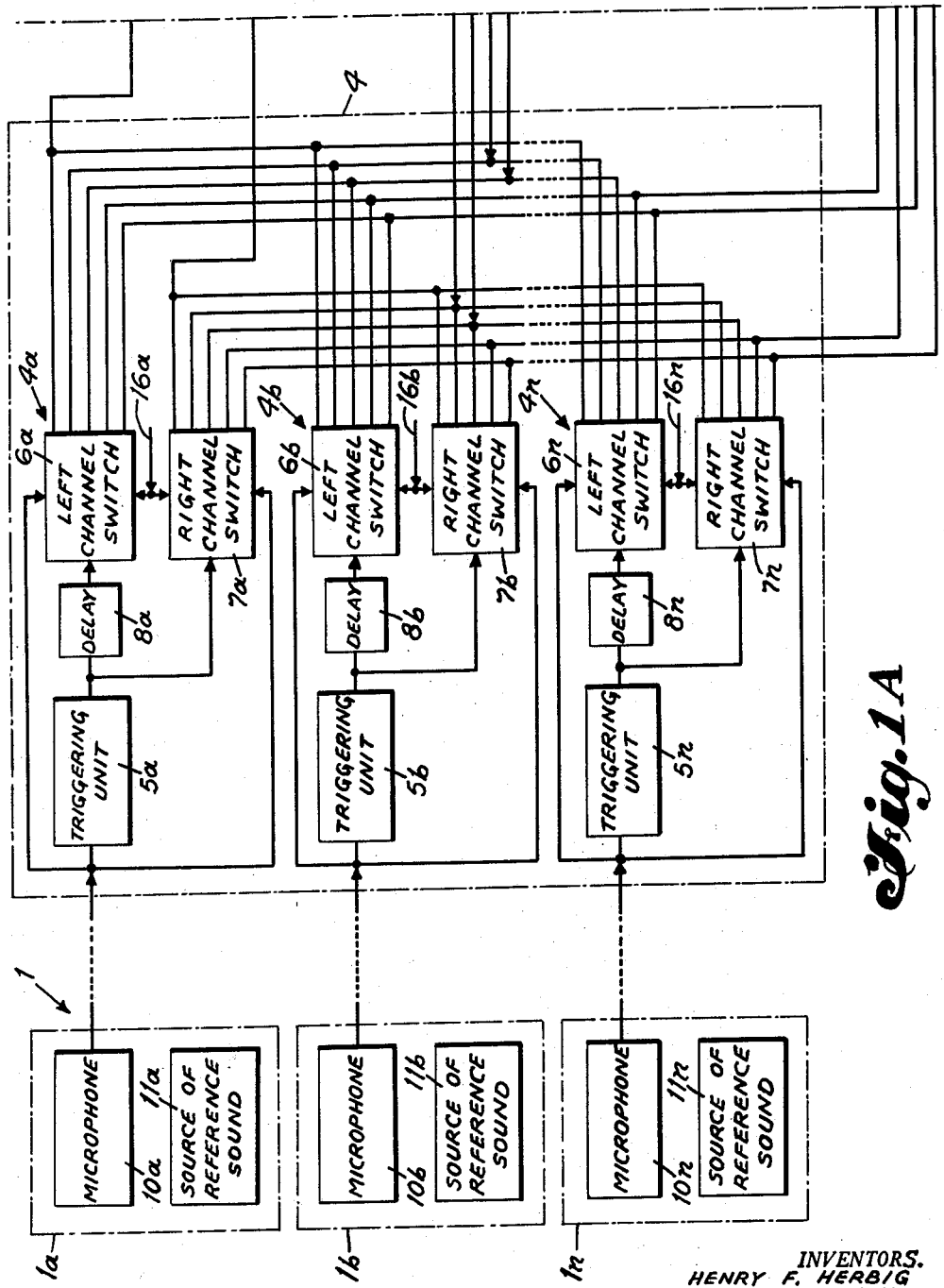

Referring to FIG. 1, a sound monitoring and recording system is shown comprising means 1 for receiving and converting sound into an electrical signal, means 2 responsive to said electrical signal to modify said signal in accordance with a given function, and means 3 for recording said modified signal from means 2.

More particularly, the present invention includes a plurality of sound monitoring equipments which may be located at points where the ambient sound is expected to be maximum (i.e. at the end of the airport runways). Each sound monitoring equipment, designated as $1a$, $1b$ ... $1n$, includes a dynamic type omnidirectional microphone $10a$, $10b$ ... $10n$ to receive the ambient sound and a source of reference sound $11a$, $11b$ ... $11n$ located such that the reference sound is directed toward the corresponding microphone from the direction opposite to that of the expected ambient sound, thereby limiting the interference with the ambient sound field near the microphone. The microphone is weather-proofed for outdoor use by coating the cover with a silicone resin and by mounting a heater around the collar of the microphone. The resin provides a hard, heat-stable film that improves the wet insulation resistance and the heater prevents formation of ice. The heater is therostatically controlled to maintain the microphone above a minimum temperature. Each source of reference sound produces a sound constant in frequency and amplitude and includes a stable oscillator for this purpose. A reference signal of 1000 c.p.s and 95 decibel level (i.e. 0.0002 microbar) is employed for reasons which will be later discussed. The output of microphones $10a$ to $10m$ will be an electrical signal corersponding to the sound pressure level of the ambient sound and the reference sound. The outputs of the sound monitors $1a$ to $1n$ may be amplified if necessary and are coupled by suitable lines to centrally located equipment.

The central equipment is designed to accept the electrical signals from a selected number of sound monitors at one time and graphically record the signals, on a dual channel recorder, in decibel units of perceived noise along with an indication of which sound monitoring equipments are producing the signals as well as the date and time of reception. It is presumed that the activity at a conventional airport will be such that all the runways will not be in use at the same time, so only certain ones of the total monitoring units will be producing sound signals of any great magnitude, and only those certain units need be employed at any given time. In the system shown in FIG. 1, "$n$" monitoring equipments are provided, but only two recording channels are provided since experience has shown that only two runways will be used at any given time. It is to be understood that if conditions require that only one recording channel is necessary, or perhaps three or more, a slight modification of the system of FIG. 1 will be required, but the principles of the present invention will still apply.

A more detailed description will follow, but generally the central equipment is designed to accept the incoming lines from the remote sound monitoring equipment. The central equipment includes a switching means 4 which detects an increase in the signal on the incoming lines above a preselected value and connects the lines to a channel filter. Switching means 4 must be able to connect any incoming line to either of two channel filters $2a$, $2b$, but one line must not be connected to both filters at the same time, and no more than one line may be connected to one filter at one time. A line must be connected to a filter when the incoming signal exceeds a preselected level; however, once a line is connected to a filter it must remain so connected for a given time (i.e. 15 seconds) after the signal has dropped below the preselected level. In addition to connecting the incoming lines to the channel filters, switching means 4 feeds information to an identification unit 12 to mark the identity of the incoming lines on the graph.

The channel filters 2a, 2b are coupled to the output of switching means 4. Each filter accepts the signal from one of the selected incoming lines and introduces a weighting factor, by means of conversion filters 13a, 13b, depending on the frequency of the incoming signal. The output signal from the filter is therefore a function of the incoming signal frequency, this function being the "perceived noise" quality of the input signal rather than the "sound pressure" quality produced by the monitoring equipments, which will be discussed more fully hereinbelow. Each channel filter also includes a logarithmic amplifier (15a, 15b) which converts the perceived noise signal into decibel units.

The output signals from channel filters 2a, 2b (in decibels) are fed to a recorder 3. Recorder 3 is a two channel graphic recorder producing a line on a moving paper tape. An alpha-numeric stamp is included in recorder 3 to imprint the date and time on the tape at the start of the recording.

A control unit 9 is provided to turn the recorder on and off, to operate the recorder identification marks, to provide a busy signal required by switching means 4, to provide the delay signal required by switching means 4 and to detect any malfunction resulting in continuous operation of recorder 3. An identification unit 12 is provided to control the recorder to provide for the identification of the signals of the incoming lines being recorded.

Discussing the system of FIG. 1 more specifically, the input signals being transmitted from sound monitoring equipments 1a to 1n will represent the sound pressure level of the ambient sound and the reference sound present at the location of each sound monitor. The signal from each sound monitor is transmitted on an associated incoming line to switching means 4. Switching means 4 includes a plurality of switching units 4a, 4b . . . 4n coupled to the separate incoming lines. Each switching unit includes a triggering unit (5a to 5n), a left channel switch (6a to 6n) and a right channel switch (7a to 7n).

The triggering units detect an increase in the incoming signals above a preselected value, and trigger one of the associated channel switches so that the incoming signal may be transmitted to one of the two channel filters 2a, 2b to be later described. Each triggering unit includes a multistage amplifier biased at a preselected value such that the channel switches will not be triggered until the incoming line signal exceeds the preselected value, which, for purposes of explanation will be specified as 5 decibels above the level of the reference sound signal.

The left channel switches 6a to 6n function to couple the respective incoming lines to left channel filter 2a, and the right channel switches 7a to 7n function to couple the respective incoming lines to right channel filter 2b. The switches are so interconnected that a first incoming signal above a given value will trigger the right channel switch coupled thereto, and the right channel switch will then disable its related left channel switch and all the other right channel switches related to the remaining incoming lines. A second incoming signal above a given value on a second incoming line will trigger the left channel switch coupled thereto and will inhibit all the other left channel switches related to the remaining incoming lines except that one coupled to the first said incoming line. All the switches are now "busy" and any incoming signals on any other incoming lines will not be accepted.

The logic of the channel switches is shown in FIG. 2. For explanation, consider the switch of FIG. 2 as being right channel switch 7a and that an incoming signal from sound monitor 1a has exceeded a value of 5 decibels above the reference sound level. Triggering unit 5a detects the increase in the incoming signal from sound monitor 1a and will trigger switch 7a. Switch 7a will trigger before switch 6a due to a small delay element 8a located prior to switch 6a for this purpose. Similar delay elements 8b to 8n are included in the other channels so that the right switch will operate in the event both left and right switches are available.

At "and" gate GB, the output signal from triggering unit 5a is gated against a busy signal from control unit 9, to be later discussed. If the right channel is busy, the busy signal will be grounded and "and" gate GB will not operate. If the right channel is not busy the busy signal will be ungrounded and the signal from triggering unit 5a will operate gate GB. The output of gate GB is fed through an "or" gate GO to an "and" gate GL where it is gated against a possible disabling signal associated with the other channel switch (in this instance switch 6a). If channel switch 6a is being operated the disabling signal will be grounded, and if channel switch 6a is not being operated the disabling signal will be ungrounded. Presuming channel switch 6a is not in operation, the disabling signal will be ungrounded and gate GL will operate. The output signal from gate GL is inverted by inverter IC and fed to an "and" gate GA where it is gated against a delay signal from a relay controlled timing circuit to be later discussed. This delay signal is normally grounded and "and" gate GA does not operate. The output signal from gate GL is also fed to "and" gate GR. Gate GR also receives the triggering signal from triggering unit 5a and the output signal therefrom is fed to a relay controlled timing circuit located in control unit 9, to be later discussed.

The output signal from gate GR also signals an identification unit 12 to be discussed later, which will cause recorder 3 to stamp the date and time, start the motor of recorder 3, and ground the busy signal which disables all the other right channel switches (7b to 7n). The output signal at gate GR also removes the ground from the delay signal at gate GA forming a circuit through gates GA, GO, GL, inverter IC and back to gate GA. The output signal from GR also grounds the busy signal at gate GB, however, the circuit maintains operation through the aforesaid circuit through gates GA, GO, GL, inverter IC and back through gate GA. The output signal from inverter IC is also fed to inverter ID to linear "and" gate GT where it gates the incoming sound signal to the right channel filter 2b. When the incoming signal falls below the predetermined level gates GB and GR will no longer operate. When the output signal of gate GR falls to zero, the relay operated timing circuit in control unit 9 starts to operate for a period of 15 seconds. During this time the timing circuit supplies a delay signal to gate GA, so that the circuit is maintained and the busy signal continues to be applied to gate GB and to the other right channel switches 7b to 7n. At the end of 15 seconds the delay signal to GA becomes grounded and the switch 7a no longer passes the incoming sound signal. The 15 second delay is provided so that momentary decreases in the incoming sound signal will not cause discontinuities in the recording and to permit recording the aforementioned reference sound signal. Absence of incoming sound signal for 15 seconds safely indicates that the sound disturbance at the associated sound monitor has ceased. "And" gate GI is associated with identification unit 12 and will be later discussed under that subject.

In the above discussion it was explained how two input sound signals from any two sound monitors may be switched through a left and right channel switch provided the sound signals are greater than 5 decibels above the reference tone. Referring again to FIG. 1, a left channel filter unit 2a is coupled in common to all the left channel switches 6a to 6n, and a right channel filter 2b is likewise coupled in common to all the right channel switches 7a to 7n. Each channel filter includes a conversion filter (13a, 13b), a voltage amplifier (14a, 14b), and a logarithmic amplifier (15a, 15b). The schematic of a conversion filter is shown in FIG. 3, and includes a series L-C circuit tuned to approximately 50 cycles, and a parallel L-C circuit tuned to approximately 7 kilocycles. Resistors are added in series with the inductances in order to set the Q of the filter, and the filter is driven through a series resistor.

Figure 4:
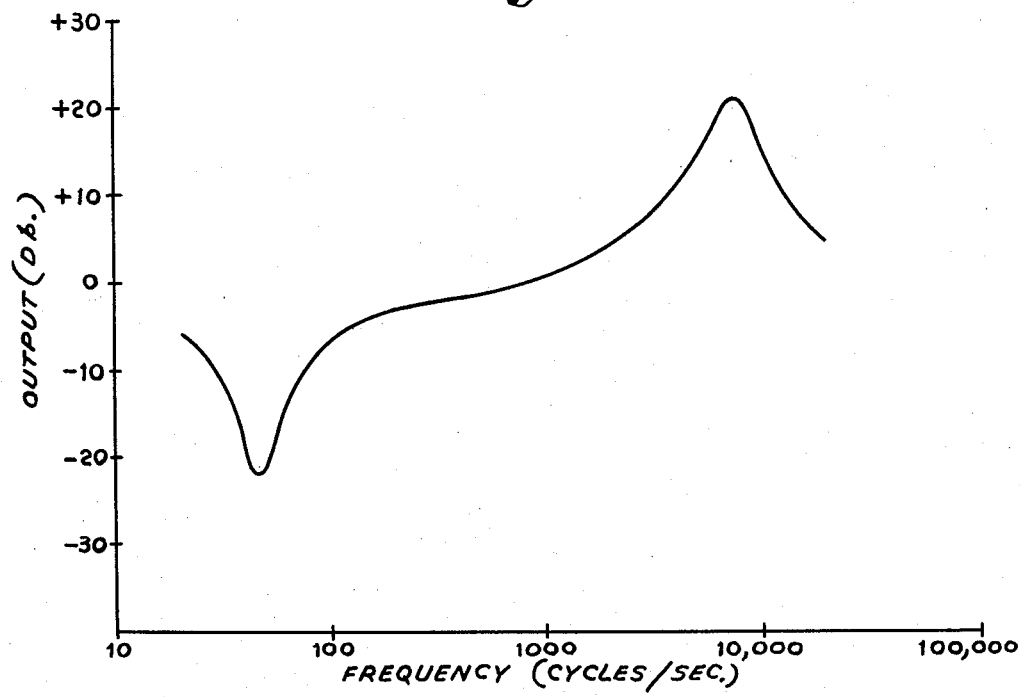
FIG. 4 is an illustration of the output signal of the filter of FIG. 2 with respect to input signal frequency.

FIG. 4 is an illustration of the frequency response curve of each conversion filter 13a, 13b. Each filter receives the input sound signals from the remote sound monitors through switching means 4 and provides that the input signal frequency is given a weighting factor that is proportional to the annoyance factor of that frequency to the average listener.

It is known that the pressure level of a sound signal is not the best indication of the amount of human annoyance that will result from the sound. Sounds of equal loudness may be more or less annoying depending on the pitch frequency. By weighting sound signals in accordance with their frequency, a factor of human annoyance for received sound signal may be realized which is herein termed "perceived noise." The weighting factor is introduced by means of the frequency response curves of conversion filters 13a and 13b. Referring to FIG. 4 it is seen that for any received sound signal of any amplitude, the amplitude of the signal will be modified depending on its frequency in accordance with the curve of FIG. 4. The magnitude of the signal amplitude variation due to the frequency response of filters 13a and 13b relative to a frequency of 1000 c.p.s. is set forth on the ordinate of the curve, which indicates, in decibels, the amount the sound signal is varied. The output signal of each conversion filter 13a and 13b is amplified in a conventional voltage amplifier (14a, 14b) and fed to a logarithmic amplifier (15a, 15b). Logarithmic amplifiers 15a and 15b receive the A.C. perceived noise signals from amplifiers 14a and 14b respectively, and provide a D.C. output signal proportional to the logarithm of the amplitude thereof, thereby converting the sound signal to decibel units.

The output signals from channel filters 2a and 2b are the input reference and ambient sound signals, above a preselected value, in decibel units of perceived noise, and may now be recorded. The signals are fed to recorder 3 shown in FIG. 1. Recorder 3 includes two recording channels and four writing arms. The left recording channel 3a is responsive to the signals from the left channel filter 2a and the right recording channel 3b is responsive to the signals from the right channel filter 2b. Each recording channel employs one writing arm which varies in response to the input signals and produces a graphic record thereof on a moving paper tape, and a second writing arm which produces heavy or light marks on the paper tape such that the number of heavy marks produced indicates the monitor from which the sound signal is being supplied. Control unit 9 and identification unit 12 cooperate to supply the necessary identification signals to the second writing arms through marker units 3c and 3d in a manner to be discussed more fully when those units are described.

Figure 5:
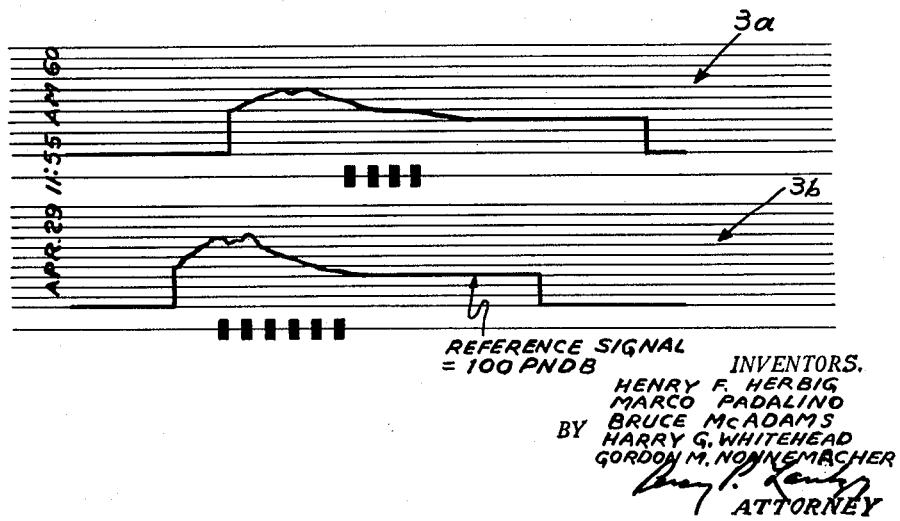
FIG. 5 is an illustration of a typical recording of monitored sound available with the system of FIG. 1.

Recorder 3 further includes a time and date stamp unit 3e. Unit 3e contains a clock which supplies the instantaneous time and date which will be stamped on the paper tape in accordance with a signal from control unit 9. FIG. 5 illustrates a typical recording possible with the system of FIG. 1. The time and date when the recording commenced on channel 3b is stamped across the tape. Since the recorder does not start until the input signal level has reached 5 decibels above the reference level, the leading edge of the recording is a vertical straight line. Each parallel gradient on the graph is 5 decibel units in the example shown, with the level of the initiating signal being selected, at 5 decibels above the reference sound of 95 decibels, as stated hereinabove, for a total value of 100 decibels. The signal on recording channel 3b is seen to have a peak of 20 decibels above the reference level. The six heavy lines on channel 3b indicate the signal being recorded as being supplied from monitor number six (which is monitor 1f, not shown in FIG. 1). During the recording on channel 3b, FIG. 5 indicates likewise a second signal was received from monitor four (monitor 1d of FIG. 1) and which attained a peak value of 15 decibels above the initial reference.

As stated hereinabove, a control unit 9 is included in the system of FIG. 1 to turn recorder 3 on and off, to operate the identification markers of recorder 3, to provide the busy signal required by switching unit 4, to provide the 15 second delay employed in the channel switches, and to detect any malfunction resulting in the continuous operation of recorder 3.

Control unit 9 includes a left channel relay 9a and a right channel relay 9b, left and right channel delay timers 9c and 9d, left and right malfunction timers 9e and 9f, and an alarm circuit 9g. The left and right channel relays 9a and 9b are coupled in common to the left and right channel switches 6a to 6n and 7a to 7n respectively and are responsive to the outputs of each gate GR of each channel switch as shown in FIG. 2. Since the left and right relay and left and right timer arrangements are duplicates, providing a left and right channel control, a single discussion will suffice for both. Consider right channel switch 7a is operating, producing an output signal from gate GR of FIG. 2 as discussed earlier. Relay 9b will operate in response to the output of gate GR. The output signal from gate GR will pass through delay timer 9d, but not commence the timing cycle. The output signal from gate GR will likewise be applied to malfunction timer 9f, which will be more fully discussed. The output signal from GR, through suitable contacts in delay timer 9d, and through suitable normally operated contacts in malfunction timer 9f, will operate the date and time stamp 3e of recorder 3 as well as start the recorder motor. At the same time the "busy" signal input of gate GB of FIG. 2, originating at timer 9d and transmitted through conductor 9h, is grounded and a delay signal input is applied to gate GA of FIG. 2, through conductor 9j, thereby initiating the holding circuit through gates GA, GO, GL, inverter IC and back to gate GA as was discussed hereinabove. The output of relay 9b (and 9a) is likewise applied to identification unit 12 in a manner described below.

Identification unit 12 provides the signal which controls the writing arms of marker units 3c and 3d of recorder 3 to produce the identification coding for the incoming sound signals. The unit includes an oscillator 12a, a binary counter 12b, a gating circuit 12c, and an indentification control circuit 12d. Oscillator 12a continually operates and causes counter 12b to likewise continually cyclically operate. Counter 12b is designed to sequentially count to a count of "m," which is the amount "n" of sound monitors 1a to 1n employed in the system plus those periods necessary for control purposes. The output signals from counter 12b are fed to both gating circuit 12c and identification control 12d. Gating circuit 12c includes "n" and gates which are sequentially operated from the counter output signals to form a distributor which produces output pulses sequentially on "n" output conductors 16a to 16n. Output conductors 16a to 16n are coupled respectively to switching units 4a to 4n where the sequential signals are applied to gates GI (as shown in FIG. 2). The signals on conductors 16a to 16n will not enable gates GI unless the related channel switches are in operation. The output of gate GI related to the enabled left channel switch is returned to identification control circuit 12d through conductor 12e, and that related to the enabled right channel switch is returned via conductor 12f.

At the same time that counter 12b is causing sequential signals to be produced from gate 12c, the counter output signals are applied to identification control circuit 12d. When recorder 3 is in operation, signifying the presence of an incoming sound signal (or signals), a contact is closed in identification control unit 12d from a signal from either relay 9a or 9b through conductors 12g and 12h so that the output of counter 12b is fed therethrough to left and right marker units 3c and 3d, causing the marker pens to print a heavy line for each count signal. Presume that incoming sound signals are being fed to recorder 3 through right channel switch 7b and left channel switch 6n. Right marker unit 3d and left marker unit 3c will begin receiving count signals from control circuit 12d. After the second count pulse a simultaneous pulse on conductor 16b has been passed through gate GI of right channel switch 7b and returned to control circuit 12d through conductor 12f, thereby opening a contact and preventing any further pulses from being applied to right marker unit 3d. Right marker unit 12d has therefore marked two lines on the recorder tape thereby identifying the incoming sound signals on the right channel as being produced at the second sound monitor (designated as 1b in FIG. 1). The left channel marker 3c will continue to mark the recorder tape until counter 12b has produced a pulse through gate 12c on conductor 16n. The pulse on conductor 16n will pass through gate GI of left channel switch 6n and be returned to control circuit 12d via conductor 12e, thereby opening a contact and disabling left marker 3c, which has produced a count of "n" lines on the recorder tape thereby identifying a signal from sound monitor 1n.

It is conceivable that the start signal from relay 9a or 9b (indicating the presence of incoming sound signal and the start of recorder 3) may occur at a time intermediate of the counting cycle of counter 12b. To insure that the left or right marker units of recorder 3 will be correctly initiated at the beginning of a count cycle, the output signals from relays 9a and 9b are in fact held by means of a flip-flop in control circuit 12d, until the beginning of a new count cycle so that the contacts which enable the marker units will operate when the count cycle begins.

In order to prevent recorder 3 from stopping before an identification has been completed, a hold circuit is provided to maintain the input signals to control circuit 12d on conductors 12g and 12h. The holding circuit includes a path in control circuit 12d which provides a holding feedback signal back to relays 9a or 9b through conductors 12j and 12k.

Oscillator 12a may be a free running multivibrator with a buffer amplifier in the output. Counter 12b may include standard flip-flop circuits, such as the Eccles-Jordan circuit to provide an "n" count output in response to the oscillator output pulses. Gate circuit 12c may include an array of "and" gates arranged to produce sequential output signals on "n" separate lines in response to the counter output. Identification control circuit 12d includes left and right gating arrangements, the left gating arrangement including an "and" gate responsive to the output of relay 9a and counter 12b to operate left marker unit 3c, and responsive to an inhibit signal on conductor 12e to disable left marker unit 3c plus a contact terminal to provide the above described holding signal. The right gating arrangement is similar to the left gating arrangement.

Referring again to the output of relays 9a and 9b, it is noted that said outputs are also applied to left and right malfunction timers 9e and 9f. After five minutes elapse (which is far in excess of normal recording operation) the normally operative output signal from timers 9e and 9f will turn off recorder 3 in the event that malfunction in the system has resulted in continuous recorder operation, as well as provided an audible or visual alarm.

It is seen from the entire discussion hereinabove, that a new and useful system has been devised for recording ambient sound at remote locations. The system provides that only sound above an abjectionable predetermined level will be recorded, and that although many remote locations may be monitored, only the minimum amount of recording equipment need by supplied depending on the system environment.

The system further provides that the time of occurrence of the sound and the identification of the sound location be also recorded, as well as providing that the sound itself is recorded in a system of units directly indicative of the degree of human annoyance therein.

While we have described above the principles of our invention in connection with specific apparatus, it is to be clearly understood that this description is made only by way of example and not as a limitation to the scope of our invention as set forth in the objects thereof and in the accompanying claims.

We claim:

1. A sound monitoring and recording system for monitoring ambient sound at remote locations and recording the level of said sound at a central location comprising sound monitoring means including a source of reference sound for receiving said ambient and reference sounds and converting said sounds into a single electrical signal, means responsive to said electrical signal to provide an output signal corresponding to values of said electrical signal above a given value, a plurality of conductors, switching means coupled intermediate said responsive means and said conductors to provide on at least one of said conductors said output signal corresponding to said electrical signal above a given value, a filter coupled to some of said conductors and responsive to said electrical signal from said switching means, said filter having a non-linear frequency response which provides varying magnitude output signal in accordance with the frequency of said electrical signal to provide an output signal which is a given function of the frequency of said electrical signal from said switching means, a recorder coupled to the output of said filter to record the frequency function signal therefrom, and control means coupled to others of said conductors to control the operation of said recorder in accordance with signals from said switching means.

2. A sound monitoring and recording system for monitoring ambient sound at remote locations and recording the level of said sound at a central location comprising a plurality of microphone devices physically displaced from each other, each including a source of reference sound, for receiving ambient sound and said reference sound and converting said sounds into single electrical signals, a plurality of means at a common location, each responsive to the signal from a separate one on said microphone devices to provide an output signal corresponding to values of said electrical signal above a given value, switching means coupled to said plurality of responsive means having a lesser plurality of output conductors to provide thereon a selected corresponding lesser plurality of said output signals from said responsive means, a corresponding lesser plurality of filters each coupled to a separate one of said conductors to provide an output signal which is a given function of the frequency of said output signal therefrom, and a corresponding lesser plurality of recorders each coupled to a separate one of said filters to record the frequency function of the signal therefrom.

3. A sound monitoring and recording system as specified in claim 2 in which there is provided a control means coupled to said switching means and responsive to the signals therefrom to control the operation of said recorders, and an identification means coupled to said switching means and said recorders to identify on said record the lesser plurality of output signals selected by said switching means and the time of reception of said signals.

4. A sound monitoring system according to claim 1 wherein said reference sound is a sound of established level constant in frequency and amplitude.

5. A sound monitoring system according to claim 1 wherein said filter includes means to decrease the amplitude of said electrical signal when the frequency thereof is below 1,000 cycles per second and to increase the amplitude of said electrical signal when the frequency thereof is above 1,000 cycles per second.

References Cited in the file of this patent

UNITED STATES PATENTS

| | | |
|---|---|---|
| 2,806,082 | Woods | Sept. 10, 1957 |
| 2,884,085 | Von Wittern | Apr. 28, 1959 |
| 3,038,119 | Billig et al. | June 5, 1962 |

OTHER REFERENCES

Stewart: Magnetic Recording Technique, McGraw-Hill Book Co. Inc., 1958.

Westcott, C. G.; Dubb, R. F.: Tape Recorders, How They Work. New York, Bobbs-Merrill Co., 1956, p. 78.